(12) United States Patent
Nakagawa et al.

(10) Patent No.: US 8,882,934 B2
(45) Date of Patent: Nov. 11, 2014

(54) SOLDER POWDER, AND SOLDER PASTE USING SOLDER POWDER

(75) Inventors: Sho Nakagawa, Iwaki (JP); Hiroki Muraoka, Iwaki (JP); Kanji Kuba, Iwaki (JP); Yousuke Kawamura, Iwaki (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 14/237,404

(22) PCT Filed: Aug. 22, 2012

(86) PCT No.: PCT/JP2012/071119
§ 371 (c)(1),
(2), (4) Date: Feb. 6, 2014

(87) PCT Pub. No.: WO2013/031588
PCT Pub. Date: Mar. 7, 2013

(65) Prior Publication Data
US 2014/0174605 A1    Jun. 26, 2014

(30) Foreign Application Priority Data

Sep. 2, 2011  (JP) ................................. 2011-191867
Sep. 2, 2011  (JP) ................................. 2011-191868

(51) Int. Cl.
| | |
|---|---|
| *B23K 35/02* | (2006.01) |
| *B22F 1/00* | (2006.01) |
| *C22C 5/06* | (2006.01) |
| *B32B 15/01* | (2006.01) |
| *B23K 35/26* | (2006.01) |
| *B22F 1/02* | (2006.01) |
| *C22C 9/02* | (2006.01) |
| *B23K 35/22* | (2006.01) |
| *B23K 35/30* | (2006.01) |
| *C22C 13/00* | (2006.01) |

(52) U.S. Cl.
CPC ................. *B23K 35/025* (2013.01); *B22F 1/00* (2013.01); *C22C 5/06* (2013.01); *B32B 15/01* (2013.01); *B23K 35/0244* (2013.01); *B23K 35/26* (2013.01); *B22F 1/025* (2013.01); *C22C 2204/00* (2013.01); *C22C 9/02* (2013.01); *B23K 35/22* (2013.01); *B23K 35/3006* (2013.01); *B32B 15/018* (2013.01); *B23K 35/262* (2013.01); *B22F 1/02* (2013.01); *C22C 13/00* (2013.01)
USPC ................................ 148/24; 148/23; 428/548

(58) Field of Classification Search
USPC .......................................................... 148/24
See application file for complete search history.

(56) References Cited

U.S. PATENT DOCUMENTS 5,573,602 A * 11/1996 Banerji et al. ................... 148/24
5,736,074 A    4/1998 Hayes et al.
(Continued)

FOREIGN PATENT DOCUMENTS

CN         1386609 A    12/2002
CN         2547456 Y     4/2003
(Continued)

OTHER PUBLICATIONS

Office Action dated Apr. 25, 2014, issued for the Taiwan Patent Application No. 101131155 and English translation thereof.

(Continued)

*Primary Examiner* — Jessee Roe
*Assistant Examiner* — Christopher Kessler
(74) *Attorney, Agent, or Firm* — Edwards Wildman Palmer LLP

(57) ABSTRACT

In solder powder having an average particle size of 5 μm or less and constituted by a center core and a covering layer covering the center core, wherein the center core consists of an intermetallic compound of silver and tin, or silver and the intermetallic compound of silver and tin, the covering layer consists of tin, and an intermediate layer which consists of an intermetallic compound of copper and tin is interposed between the center core and the covering layer so that at least a part of the center core is covered thereby.

5 Claims, 6 Drawing Sheets

(56) References Cited

U.S. PATENT DOCUMENTS

| | | | |
|---|---|---|---|
| 6,872,465 B2 | 3/2005 | Soga et al. | |
| 7,022,266 B1 * | 4/2006 | Craig | 252/512 |
| 7,265,046 B2 | 9/2007 | Kondo et al. | |
| 7,524,351 B2 * | 4/2009 | Hua et al. | 75/252 |
| 8,348,134 B2 | 1/2013 | Komatsu | |
| 8,459,529 B2 | 6/2013 | Komatsu | |
| 2003/0156969 A1 * | 8/2003 | Choi et al. | 420/560 |
| 2003/0224197 A1 | 12/2003 | Soga et al. | |
| 2006/0055054 A1 | 3/2006 | Kondo et al. | |
| 2007/0084904 A1 | 4/2007 | Sumikawa et al. | |
| 2007/0278456 A1 | 12/2007 | Sakai et al. | |
| 2009/0269598 A1 | 10/2009 | Ohashi et al. | |
| 2011/0042447 A1 | 2/2011 | Komatsu | |
| 2013/0098205 A1 | 4/2013 | Komatsu | |
| 2013/0164187 A1 | 6/2013 | Komatsu | |

FOREIGN PATENT DOCUMENTS

| | | |
|---|---|---|
| CN | 1443625 A | 9/2003 |
| CN | 1572129 A | 1/2005 |
| CN | 2753499 Y | 1/2006 |
| CN | 1826664 A | 8/2006 |
| CN | 101049657 A | 10/2007 |
| CN | 101081462 A | 12/2007 |
| CN | 101567228 A | 10/2009 |
| CN | 101671784 A | 3/2010 |
| CN | 101745636 A | 6/2010 |
| CN | 101767198 A | 7/2010 |
| CN | 101869982 A | 10/2010 |
| CN | 101990474 A | 3/2011 |
| JP | 05-337679 A | 12/1993 |
| JP | 06-264116 A | 9/1994 |
| JP | 2004-018956 A | 1/2004 |
| JP | 2004-090011 A | 3/2004 |
| JP | 2008-149365 A | 7/2008 |
| JP | 2008-149366 A | 7/2008 |
| JP | 2012-152782 A | 8/2012 |
| JP | 2012-157869 A | 8/2012 |
| JP | 2012-157870 A | 8/2012 |

OTHER PUBLICATIONS

Office Action dated Jun. 13, 2014, issued for the Korean patent application No. 2014-7003762 and English translation thereof.
International Search Report dated Nov. 20, 2012, issued for PCT/JP2012/071119.
Office Action dated Jul. 1, 2014, issued for the corresponding Chinese patent application No. 201280030839.9 and English translation thereof.

* cited by examiner (a)

(b)

SOLDER POWDER, AND SOLDER PASTE USING SOLDER POWDER

TECHNICAL FIELD

The present invention relates to lead-free solder powder for fine pitch and a paste for solder using the powder. More specifically, it relates to an Sn series fine solder powder having an average particle size of 5 μm or less and a paste for solder using the powder.

BACKGROUND ART

A solder to be used for bonding of electronic parts is advancing to be lead-free from the viewpoint of environment, and has now been employed a solder powder containing tin as a main component. As a method for obtaining a fine metal powder such as the solder powder, there have been known, in addition to the atomizing method such as the gas atomizing method and the rotary disc method, etc., the melt spinning method, the rotary electrode method, the mechanical process and the chemical process, etc. The gas atomizing method is a method in which a metal is melted by an induction furnace or a gas furnace, the molten metal is flowed down from a nozzle at the bottom of a tundish, and a high pressure gas is blown thereto from the circumference to powderize the metal. The rotary disc method is also called as the centrifugal force atomizing method, and is a method to prepare fine powder by dropping a molten metal on a disc rotating with a high speed to apply a shearing force to the tangential direction to fracture the metal.

On the other hand, finer pitch of bonding parts is also progressing with miniaturization of electronic parts, and solder powder having a finer particle size is desired, so that improvement in technologies for such a finer pitch has also been actively carried out. For example, as a technique in which the gas atomizing method has been improved, it has been disclosed a method for manufacturing metal fine powder in which a molten metal in a gas-entrained state is jetted from a nozzle and a high pressure gas is blown from the circumference of the nozzle against the metal (for example, see Patent Document 1.). According to the method disclosed in Patent Document 1, by entraining the gas into the molten metal when it passes through the nozzle, the molten metal has already been separated at the time of tapping from the nozzle whereby finer powder can be produced.

In addition, as a technique in which the rotary disc method has been improved, it has been disclosed a preparation method of metal fine powder in which a mesh is arranged to a rotary member as a means for adjusting a size of the metal fine powder, and a molten metal is scattered through the mesh (for example, see Patent Document 2.). According to the method disclosed in Patent Document 2, fine metal powder can be formed with good efficiency as compared with the conventional rotary disc method.

Further, it has been is disclosed a solder powder which is obtained by the wet reduction method, that a yield of the solder powder having an average particle size of 5 μm or less is extremely high (for example, see Patent Document 3.). This solder powder is a ternary solder powder which consists of a metal particle of a center core, a covering layer encapsulating the center core, and an outermost layer encapsulating the covering layer to improve wettability of a paste for solder or strength required for a solder bump. This solder powder consists of a metal particle in which all the three kinds of metals are contained in one particle, so that the composition is more uniform as compared with a solder powder in which different kinds of single-metal powders are simply mixed. Also, it has a structure in which an intermediate layer and an outermost layer are successively coated over a center core in this order depending on an ionization tendency of metal elements forming the respective layers, so that a process of reducing a metal ion to precipitate a powder is not so complicated whereby it is also excellent in mass productivity.

PRIOR ART REFERENCES

Patent Document

Patent Document 1: JP 2004-18956A (claim 1, paragraph [0014])
Patent Document 2: JP H06-264116 A (claim 1, paragraph [0016], FIG. 3)
Patent Document 3: JP 2008-149366A (claim 1, paragraph [0019] to paragraph [0023], paragraph [0026])

SUMMARY OF THE INVENTION

Problems to be Solved by the Invention

For obtaining finer powder by using the so-called atomizing method disclosed in the above-mentioned conventional Patent Documents 1 and 2, however, it is necessary to further classifying the metal powder obtained by the method to collect finer powder having 5 μm or less which can correspond to fine pitch. Therefore, the yield thereof becomes very bad. On the other hand, the powder having 7 μm or so can be obtained by the above method with a good yield, but the powder with such a particle size cannot sufficiently comply with the fine pitch in recent years.

In addition, in the solder powder disclosed in the above-mentioned Patent Document 3, in the case of a solder powder in which a center core and an intermediate layer are formed by single metal element different from tin, diffusion occurs after erosion reaction, so that there are problems that it takes a time at the time of melting for forming a solder bump, and wettability is poor.

An object of the present invention is to provide solder powder which is a fine solder powder suitable for a paste for solder realizing fine pitch, in which melt diffusibility at the time of reflow is good, the composition at the time of forming a solder bump can be easily controlled and wettability is excellent, and a paste for solder using the powder.

Means for Solving the Problems

The first aspect of the present invention is, as shown in FIG. 1 or FIG. 4, solder powder 10 having an average particle size of 5 μm or less and constituted by a center core 11 and a covering layer 13 covering the center core 11, wherein the center core 11 consists of an intermetallic compound of silver and tin, or silver 11a and an intermetallic compound 11b of silver and tin, the covering layer 13 consists of tin, and an intermediate layer 12 which consists of an intermetallic compound of copper and tin is interposed between the center core 11 and the covering layer 13 so that at least a part of the center core 11 is covered thereby.

The second aspect of the present invention is an invention based on the first aspect, wherein the intermetallic compound of silver and tin is $Ag_3Sn$ or $Ag_4Sn$, and the intermetallic compound of copper and tin is $Cu_3Sn$ or $Cu_6Sn_5$.

The third aspect of the present invention is an invention based on the first aspect, wherein a content of silver is 0.1 to 10% by mass, and a content of copper is 0.1 to 2.0% by mass based on the total amount of the solder powder as 100% by mass.

The fourth aspect of the present invention is a paste for solder obtained by mixing the solder powder of the first aspect and a flux for solder to make a paste.

The fifth aspect of the present invention is a paste for solder of the fourth aspect which is used for mounting an electronic part.

Effects of the Invention

The solder powder of the first aspect of the present invention is solder powder having an average particle size of 5 μm or less constituted by a center core and a covering layer which covers the center core, wherein the center core consists of an intermetallic compound of silver and tin, or silver and an intermetallic compound of silver and tin, the covering layer consists of tin, and an intermediate layer which consists of an intermetallic compound of copper and tin is interposed between the center core and the covering layer so that at least a part of the center core is covered thereby. Thus, in the solder powder of the present invention, the center core is constituted of the intermetallic compound of silver and tin, or silver and the intermetallic compound of silver and tin, and the intermediate layer interposing between the center core and the covering layer is constituted of the intermetallic compound of copper and tin, so that melt diffusibility at the time of reflow is good, the composition at the time of forming a solder bump can be easily controlled and wettability is excellent as compared with the conventional solder powder in which either one of the center core or the intermediate layer, or both of them is/are made of a single metal element. In addition, it is fine powder having an average particle size of 5 μm or less, so that it can be printed with a fine pitch pattern when a paste for solder using the powder as a starting material is printed to a substrate, etc.

A paste for solder of the fourth aspect of the present invention can be obtained by using the above-mentioned solder powder of the present invention. Therefore, the paste for solder is rapidly melted at the time of reflow, and the wettability is extremely good, so that occurrence of the so-called solder balls in which a melted paste is scattered with a spherical shape at the time of forming a solder bump can be markedly suppressed. Moreover, the composition of the solder bump after formation thereof can be made uniform, so that the solder bump can be formed without generating any unmelted residue. Further, the solder powder is fine as 5 μm or less, and the paste for solder is used, printing can be carried out to a substrate, etc., with a fine pitch pattern and finer electronic parts can be mounted.

EMBODIMENTS OF THE INVENTION

Figure 1:
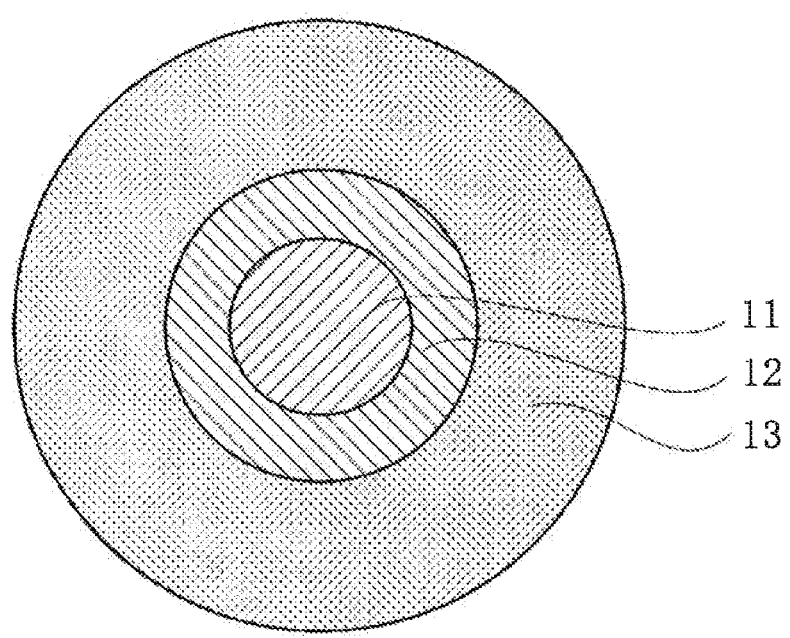
FIG. 1 is a drawing schematically showing an example of a cross-sectional structure of the solder powder of the first embodiment of the present invention.

Next, embodiments to carry out the present invention are explained by referring to the drawings.

The solder powder of the first embodiment of the present invention is, as shown in FIG. 1, constituted of a center core 11, and a covering layer 13 which covers the center core 11, and is a powder having an average particle size of 5 μm or less, preferably 0.1 to 5 μm. The reason why the average particle size of the solder powder has been limited to 5 μm or less is that if it exceeds 5 μm, a paste for solder cannot be printed to a substrate, etc., with a fine pitch pattern, and finer electronic parts cannot be mounted by a paste for solder. Incidentally, in the present specification, the average particle size of the powder means a volume cumulative median diameter (Median diameter, $D_{50}$) measured by a particle size distribution measurement device (manufactured by HORIBA Ltd., laser diffraction/scattering type particle size distribution measurement device LA-950) using a laser diffraction scattering method. The characteristic structure of the solder powder of the first embodiment according to the present invention resides in that the center core 11 consists of an intermetallic compound of silver and tin, the covering layer 13 consists of tin, and the intermediate layer 12 which consists of an intermetallic compound of copper and tin is interposed between the center core 11 and the covering layer 13 so that at least a part of the center core 11 is covered by the same. Incidentally, FIG. 1 is a drawing schematically showing the structure in which the center core 11 is completely covered by the intermediate layer 12, and the invention is not limited by such a structure alone and contains a structure in which the intermediate layer 12 is so interposed that it covers a part of the center core 11.

Thus, in the solder powder of the first embodiment of the present invention, the center core has been previously made as an intermetallic compound of silver and tin, and the intermediate layer interposed between the center core and the covering layer has been made as an intermetallic compound of copper and tin so that melt diffusibility at the time of reflow is extremely good as compared with, for example, the conventional solder powder, etc., in which either one of the center core or the intermediate layer, or both of them is/are made of a single metal element. The technical reason thereof is estimated that tin has already been diffused in the case of the intermetallic compound of silver and tin, etc., so that a solid-liquid co-existing state is a shorter time and fluidity of the melt is higher as compared with, for example, silver which consists of a single metal element. Also, in the solder powder of the first embodiment of the present invention, in one metal particle constituting the powder, an intermetallic compound has been already formed by silver and tin, or copper and tin, so that the composition easily becomes uniform at the time of forming a solder bump and the composition can be easily controlled as compared with the above-mentioned conventional solder powder, etc. For the reasons as mentioned above, the solder powder of the first embodiment of the present invention is excellent in wettability. Further, since this is fine powder having an average particle size of 5 μm or less, it can be printed with a fine pitch pattern when a paste for solder using the powder as a starting material is printed to a substrate, etc.

Figure 4:
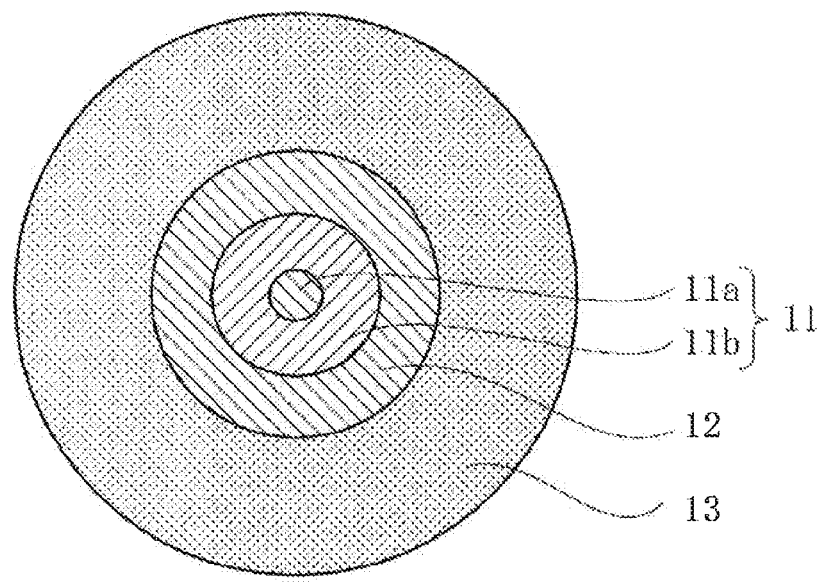
FIG. 4 is a drawing schematically showing an example of a cross-sectional structure of the solder powder of the second embodiment of the present invention.

Also, the solder powder of the second embodiment of the present invention is, as shown in FIG. 4, similarly in the solder powder of the above-mentioned first embodiment, constituted of a center core 11, and a covering layer 13 which covers the center core 11, and is a powder having an average particle size of 5 µm or less, preferably 0.1 to 5 µm. The reason why the average particle size of the solder powder has been limited to 5 µm or less is that if it exceeds 5 µm, a paste for solder cannot be printed to a substrate, etc., with a fine pitch pattern, and finer electronic parts cannot be mounted by the paste for solder. The characteristic structure of the solder powder of the second embodiment according to the present invention resides in that the center core 11 consists of silver 11a and an intermetallic compound of silver and tin 11b, the covering layer 13 consists of tin, and the intermediate layer 12 which consists of an intermetallic compound of copper and tin is interposed between the center core 11 and the covering layer 13 so that at least a part of the center core 11 is covered by the same. Incidentally, FIG. 4 is a drawing schematically showing the structure in which the center core 11 is completely covered by the intermediate layer 12, and the invention is not limited by such a structure alone and contains a structure in which the intermediate layer 12 is so interposed that it covers a part of the center core 11.

Thus, in the solder powder of the second embodiment of the present invention, the center core has been previously made silver and an intermetallic compound of silver and tin, and the intermediate layer interposed between the center core and the covering layer has been made an intermetallic compound of copper and tin so that melt diffusibility at the time of reflow is extremely good as compared with, for example, the conventional solder powder, etc., in which either one of the center core or the intermediate layer, or both of them is/are made of a single metal element. The technical reason thereof is estimated that tin has already been diffused in the case of the intermetallic compound comprising silver and tin, etc., so that a solid-liquid co-existing state is a shorter time and fluidity of the melt is higher as compared with, for example, silver which consists of a single metal element. Also, in the solder powder of the second embodiment of the present invention, in one metal particle constituting the powder, an intermetallic compound formed from silver and tin, or copper and tin resides, so that the composition easily becomes uniform at the time of forming a solder bump and the composition can be easily controlled as compared with the above-mentioned conventional solder powder, etc. For the reasons as mentioned above, the solder powder of the second embodiment of the present invention is excellent in wettability. Further, since this is fine powder having an average particle size of 5 µm or less, printing can be done with a fine pitch pattern when a paste for solder using the powder as a starting material is printed to a substrate, etc.

In the solder powder of the first and the second embodiments of the present invention, the above-mentioned intermetallic compound of silver and tin constituting the center core may be mentioned $Ag_3Sn$ or $Ag_4Sn$, on the other hand, the intermetallic compound of copper and tin constituting the intermediate layer interposed between the center core and the covering layer may be mentioned $Cu_3Sn$ or $Cu_6Sn_5$.

Also, the content of the silver in the solder powder is, in both of the solder powder of the first embodiment and the solder powder of the second embodiment, preferably 0.1 to 10% by mass, more preferably 1.0 to 5.0% by mass based on 100% by mass of the total amount of the whole solder powder. Also, the content of the copper in the solder powder is preferably 0.1 to 2.0% by mass, more preferably 0.3 to 1.0% by mass. Here, the reasons why the contents of the above-mentioned elements are limited to the above-mentioned ranges are to make the melting point of the solder powder low by preventing from fluctuating the composition from a eutectic point, and to improve mechanical strength by suppressing increase in electric resistance of the solder alloy at the formed solder bump. Also, if the ratio of the silver or the copper is extremely little or extremely much, wettability tends to be worsened. This is considered by the reason that if the ratio of the silver or the copper is extremely little, the composition of the powder becomes near to the tin single material which is easily oxidized, and on the other hand, if the ratio of the silver or the copper is extremely much, the solid-liquid co-presenting region is broad and the fluidity of the melt is low.

Further, the content of the tin in the solder powder is 88.0 to 99.8% by mass, preferably 94.0 to 98.7% by mass based on 100% by mass of the whole amount of the solder powder. If the content of the tin is less than the lower limit value, it does not show a low melting point necessary for the solder powder. Also, if it exceeds the upper limit value, wettability of the paste at the time of reflow is lowered or mechanical strength of the formed solder bump is lowered.

Subsequently, the method for manufacturing the above-mentioned solder powder of the present invention is explained. First, to a solvent are added a metal element which constitutes an intermetallic compound of a center core, i.e., a compound containing silver, a metal element which constitutes an intermetallic compound of an intermediate layer, i.e., a compound containing copper, a compound containing tin which constitutes a center core and an intermetallic compound of an intermediate layer or a covering layer, and a dispersing agent, and these compounds are mixed to prepare a dissolved solution. Contents of the compound containing silver, the compound containing copper and the compound containing tin in the dissolved solution are so adjusted that the content of each metal element is within the above-mentioned range after preparation of the solder powder.

Also, as the above-mentioned dissolved solution, silver powder is used in place of the above-mentioned compound containing silver, and the silver powder and a dispersing agent are added to a solvent and mixed to prepare a dispersion of the silver powder, then, the above-mentioned compound containing copper and a compound containing tin are directly added to the dispersion and mixed to dissolve therein, or a compound containing copper and a compound containing tin are each dissolved in a solvent to previously prepare two kinds of metal solutions, and these solutions are added to the dispersion of the above-mentioned silver powder and mixed, and the resulting dissolved solution in which the silver powder has been dispersed may be used. A ratio of the silver powder, the compound containing copper and the compound containing tin to be used in this case is so adjusted that the content of each metal element becomes within the above-mentioned range after preparation of the solder powder.

The silver compound to be used for preparing the dissolved solution may be mentioned silver(I) sulfate, silver(I) chloride or silver(I) nitrate, etc. On the other hand, the silver powder to be used in place of the silver compound may be mentioned not only silver powder having an average particle size of 0.1 to 2.0 µm, and obtained by the chemical method by the reducing reaction, but also silver powder obtained by the physical method such as the atomizing method. Also, the copper compound to be used for preparing the dissolved solution may be mentioned copper(II) chloride, copper(II) sulfate or copper acetate (II), etc., and the tin compound may be mentioned tin(II) chloride, tin(II) sulfate, tin(II) acetate, tin(II) oxalate, etc. Among these, when the dissolved solution in which the compound containing silver, the compound containing copper and the compound containing tin are dissolved is to be used, it is particularly preferred to use, as the silver compound, the copper compound and the tin compound, each sulfate of silver(II) sulfate, copper(II) sulfate and tin (II) sulfate. This is because, when the silver compound is to be used, if chlorides of copper and tin are used, coarse particles of the silver chloride are generated, and the solder powder obtained by using the same as a center core becomes particles having larger average particle size than those of the intended particles in some cases.

On the other hand, when the dissolved solution in which the silver powder has been dispersed is used, it is particularly preferred to use, as the copper compound and the tin compound, each sulfate of copper(II) sulfate and tin(II) sulfate, or chloride of copper(II) chloride and tin(II) chloride. In the method of using the dissolved solution in which the silver powder has been dispersed, the reason why not only the sulfate but also the chloride have been suitably used for preparing the dissolved solution is that only the surface of the silver powder becomes a chloride, the average particle size of the silver powder has not been substantially changed, and the solder powder obtained by using the above particles as a center core likely becomes the intended average particle size.

The solvent may be mentioned water, an alcohol, an ether, a ketone, an ester, etc. Also, the dispersing agent may be mentioned a cellulose series, a vinyl series, a polyvalent alcohol, etc., and in addition, gelatin, casein, etc., can be used. A pH of the prepared dissolved solution is then adjusted. The pH is preferably adjusted to the range of 0 to 2.0 considering redissolution of the formed solder powder, etc. Incidentally, after adding the above-mentioned metal compounds to the solvent, respectively, and dissolving therein, a complexing agent is then added thereto to make each metal element complex, and the dispersing agent may be added to the mixture. By adding the complexing agent, metal ions are not precipitated at a pH in the range of an alkaline side, and the synthesis can be carried out with a wide range. The complexing agent may be mentioned succinic acid, tartaric acid, glycolic acid, lactic acid, phthalic acid, malic acid, citric acid, oxalic acid, ethylenediaminetetraacetic acid, iminodiacetic acid, nitrilotriacetic acid or a salt thereof, etc.

Next, an aqueous solution into which a reducing agent has been dissolved is prepared, and a pH of the aqueous solution is adjusted to substantially the same as that of the dissolved solution prepared as mentioned above. The reducing agent may be mentioned a boron hydride such as sodium tetrahydroborate, dimethylamine borane, etc., a nitrogen compound such as a hydrazine, etc., and a metal ion such as a trivalent titanium ion and a divalent chromium ion, etc.

Next, an aqueous reducing agent solution is added to the above-mentioned dissolved solution and the mixture is mixed, each metal ion in the dissolved solution is reduced to obtain a dispersion in which metal powder is dispersed in the liquid. In the reducing reaction, when the above-mentioned dissolved solution in which the compound containing silver, the compound containing copper and the compound containing tin have been dissolved therein is used, silver which is nobler than tin and copper is firstly reduced, then, copper which is nobler than tin is reduced, and finally tin is reduced. On the other hand, when the dissolved solution in which the silver powder has been dispersed is used, copper which is nobler than tin is firstly reduced to precipitate copper on the surface of the silver particles, and then, tin is reduced. According to this procedure, a metal powder having an average particle size of 5 μm or less, which is constituted from a center core which consists of silver, a covering layer which consists of tin and covers the center core, and an intermediate layer which consists of copper and is interposed at least a part between the center core and the covering layer, is formed. The method for mixing the dissolved solution and the aqueous reducing agent solution may be mentioned a method in which the aqueous reducing agent solution is added dropwise to the dissolved solution in a vessel with a predetermined addition rate, and stirring the mixture by a stirrer, etc., or a method in which by using a reaction tube having a predetermined diameter, the both solutions are injected into the reaction tube with predetermined flow rates to mix these solutions, etc.

Then, the dispersion is separated into a solid and a liquid by decantation, etc., and the recovered solid component is washed with water, or an aqueous hydrochloric acid solution, an aqueous nitric acid solution, an aqueous sulfuric acid solution each pH of which is adjusted to 0.5 to 2, or methanol, ethanol, acetone, etc. After washing, the solid and the liquid are again separated and the solid component recovered. The procedures from washing to solid-liquid separation are repeated preferably 2 to 5 times.

Next, to the recovered solid component is added a high boiling point solvent having a boiling point of 100° C. or higher to disperse therein, and the dispersion is heated at a predetermined temperature under inert gas atmosphere. By applying the heat treatment, a center core constituted of silver of the metal powder formed by the above-mentioned reducing reaction or a part thereof, and an intermediate layer constituted of copper which covers at least a part of the center core reacts with a part of the covering layer constituted of tin. According to this procedure, an intermetallic compound of silver and tin which constitutes a center core of the solder powder of the first and the second embodiments of the present invention or a part of the center core, and an intermetallic compound of copper and tin which constitutes an intermediate layer of these solder powders are formed.

The high boiling point solvent to be used may be mentioned ethylene glycol, diethylene glycol, triethylene glycol, polyethylene glycol, castor oil, etc.

The above-mentioned heat treatment for obtaining the solder powder of the first embodiment of the present invention is preferably carried out at a temperature of 140 to 180° C. for 20 minutes to 1 hour. If the treatment temperature or the holding time is less than the lower limit value, there is a case where the center core is not constituted by the intermetallic compound alone. Also, if the treatment temperature exceeds the upper limit value, tin of the covering layer is oxidized and an inconvenience occurs that the meltability is lowered. Incidentally, even if the holding time is made to be the upper limit value or longer, the effect is not changed. Among these, it is particularly preferred to carry out the procedure at 160° C. for 30 minutes.

On the other hand, the above-mentioned heat treatment for obtaining the solder powder of the second embodiment of the present invention is preferably carried out at a temperature of 100 to 130° C. for 20 minutes to 1 hour. If the treatment temperature or the holding time is less than the lower limit value, an intermetallic compound is not formed to the center core and the intermediate layer, or the intermediate layer is not constituted only by the intermetallic compound in some cases. Incidentally, even if the holding time is made to be the upper limit value or longer, the effect is not changed. Among these, it is particularly preferred to carry out the procedure at 120° C. for 30 minutes.

After heating, the steps from the above-mentioned washing to solid-liquid separation are again repeated preferably 2 to 5 times, and the recovered solid component is vacuum dried to obtain the solder powder of the present invention.

According to the above procedures, solder powder of the present invention can be obtained. The solder powder can be suitably used as a material forme for solder which can be obtained by mixing with a flux for solder to make a paste. Preparation of the paste for solder is carried out, for example, by mixing a flux for solder in an amount preferably 10 to 30% by mass, further preferably 10 to 25% by mass and make a paste. The reason why the mixed amount of the flux for solder is made to be 10 to 30% by mass is that, if it is less than 10% by mass, a paste cannot be prepared due to lack the flux, while if it exceeds 30% by mass, the content of the flux in the paste is too much and the content of the metal becomes less and a solder bump with a desired size cannot be obtained at the time of melting the solder.

The paste for solder uses the above-mentioned solder powder of the present invention as a material, so that meltability and wettability thereof are extremely good, and it is excellent in the point that solder balls are not easily generated. Also, the composition of the solder bump after formation thereof can be made more uniform, so that the solder bump formed by using the same is excellent in generating no unmelted residue. Further, it is prepared by fine solder powder of 5 μm or less, when the paste for solder is used, printing can be carried out to the substrate, etc., with a fine pitch pattern, and a solder bump with less unevenness in height can be formed. Therefore, the paste for solder can be suitably used for mounting finer electronic parts.

EXAMPLES

Next, Examples of the present invention are explained in detail with Comparative Examples.

Example 1

First, to 50 ml of water were added $2.54 \times 10^{-4}$ mol of copper(II) sulfate, $4.48 \times 10^{-4}$ mol of silver(I) sulfate and $2.62 \times 10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 (polyvinyl alcohol with an average molecular weight of 500) was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to obtain a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added to the above-mentioned powder after washing to disperse therein, and the mixture was heated under stirring with a rotation rate of 300 rpm at 160° C. for 30 minutes. After the heating, the dispersion was again allowed to stand for 60 minutes to precipitate the heated metal powder, then, the supernatant solution was discharged, and 100 mL of water was added thereto and stirred at a rotation rate of 300 rpm for 10 minutes, which operations were repeated four times to carry out washing. Finally, this powder was dried by a vacuum dryer to obtain solder powder comprising an intermetallic compound $Ag_3Sn$ as a center core, tin as a covering layer, and an intermetallic compound $Cu_6Sn_5$ being interposed between the center core and the covering layer so as to cover at least a part of the center core.

Example 2

First, to 50 ml of water were added $2.56 \times 10^{-4}$ mol of copper(II) sulfate, $6.04 \times 10^{-4}$ mol of silver(I) sulfate and $2.62 \times 10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to prepare a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added thereto to disperse therein, and the mixture was heated under stirring with a rotation rate of 300 rpm at 160° C. for 30 minutes. After the heating, the dispersion was again allowed to stand for 60 minutes to precipitate the heated metal powder, then, the supernatant solution was discharged and 100 mL of water was added thereto and stirred at a rotation rate of 300 rpm for 10 minutes, which operations were repeated four times to carry out washing. Finally, this powder was dried by a vacuum dryer to obtain solder powder comprising an intermetallic compound $Ag_3Sn$ as a center core, tin as a covering layer, and an intermetallic compound $Cu_6Sn_5$ being interposed between the center core and the covering layer so as to cover at least a part of the center core.

Example 3

First, to 50 ml of water were added $9.86 \times 10^{-5}$ mol of copper(II) sulfate, $7.26 \times 10^{-5}$ mol of silver(I) sulfate and $2.62 \times 10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to obtain a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added thereto to disperse therein, and the mixture was heated under stirring with a rotation rate of 300 rpm at 160° C. for 30 minutes. After the heating, the dispersion was again allowed to stand for 60 minutes to precipitate the heated metal powder, then, the supernatant solution was discharged and 100 mL of water was added thereto and stirred at a rotation rate of 300 rpm for 10 minutes, which operations were repeated four times to carry out washing. Finally, this powder was dried by a vacuum dryer to obtain solder powder comprising an intermetallic compound $Ag_3Sn$ as a center core, tin as a covering layer, and an intermetallic compound $Cu_6Sn_5$ being interposed between the center core and the covering layer so as to cover at least a part of the center core.

Example 4

First, to 50 ml of water were added $8.25×10^{-4}$ mol of copper(II) sulfate, $1.54×10^{-3}$ mol of silver(I) sulfate and $2.62×10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to obtain a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added thereto to disperse therein, and the mixture was heated under stirring with a rotation rate of 300 rpm at 160° C. for 30 minutes. After the heating, the dispersion was again allowed to stand for 60 minutes to precipitate the heated metal powder, then, the supernatant solution was discharged and 100 mL of water was added thereto and stirred at a rotation rate of 300 rpm for 10 minutes, which operations were repeated four times to carry out washing. Finally, this powder was dried by a vacuum dryer to obtain solder powder comprising an intermetallic compound $Ag_3Sn$ as a center core, tin as a covering layer, and an intermetallic compound $Cu_6Sn_5$ being interposed between the center core and the covering layer so as to cover at least a part of the center core.

Example 5

First, to 50 ml of water were added $2.45×10^{-5}$ mol of copper(II) sulfate, $7.22×10^{-6}$ of silver(I) sulfate and $2.62×10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to obtain a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added thereto to disperse therein, and the mixture was heated under stirring with a rotation rate of 300 rpm at 160° C. for 30 minutes. After the heating, the dispersion was again allowed to stand for 60 minutes to precipitate the heated metal powder, then, the supernatant solution was discharged and 100 mL of water was added thereto and stirred at a rotation rate of 300 rpm for 10 minutes, which operations were repeated four times to carry out washing. Finally, this powder was dried by a vacuum dryer to obtain solder powder comprising an intermetallic compound $Ag_3Sn$ as a center core, tin as a covering layer, and an intermetallic compound $Cu_6Sn_5$ being interposed between the center core and the covering layer so as to cover at least a part of the center core.

Example 6

First, to 50 ml of water were added $1.24×10^{-3}$ mol of copper(II) sulfate, $1.83×10^{-3}$ mol of silver(I) sulfate and $2.62×10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to prepare a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added thereto to disperse therein, and the mixture was heated under stirring with a rotation rate of 300 rpm at 160° C. for 30 minutes. After the heating, the dispersion was again allowed to stand for 60 minutes to precipitate the heated metal powder, then, the supernatant solution was discharged and 100 mL of water was added thereto and stirred at a rotation rate of 300 rpm for 10 minutes, which operations were repeated four times to carry out washing. Finally, this powder was dried by a vacuum dryer to obtain solder powder comprising an intermetallic compound $Ag_3Sn$ as a center core, tin as a covering layer, and an intermetallic compound $Cu_6Sn_5$ being interposed between the center core and the covering layer so as to cover at least a part of the center core.

Comparative Example 1

To 50 mL of water were added $2.54×10^{-4}$ mol of copper(II) sulfate, $4.48×10^{-4}$ mol of silver(I) sulfate and $2.62×10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to prepare a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

This was dried by a vacuum dryer to obtain solder powder comprising Ag as a center core, Cu as an intermediate layer and tin as a covering layer.

Example 7

First, to 50 ml of water were added $2.54 \times 10^{-4}$ mol of copper(II) sulfate, $4.48 \times 10^{-4}$ mol of silver(I) sulfate and $2.62 \times 10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 (polyvinyl alcohol with an average molecular weight of 500) was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to prepare a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added to the above-mentioned powder after washing to disperse therein, and the mixture was heated under stirring with a rotation rate of 300 rpm at 120° C. for 30 minutes. After the heating, the dispersion was again allowed to stand for 60 minutes to precipitate the heated metal powder, then, the supernatant solution was discharged, and 100 mL of water was added thereto and stirred at a rotation rate of 300 rpm for 10 minutes, which operations were repeated four times to carry out washing. Finally, this powder was dried by a vacuum dryer to obtain solder powder comprising Ag and an intermetallic compound $Ag_3Sn$ as a center core, tin as a covering layer, and an intermetallic compound $Cu_6Sn_5$ being interposed between the center core and the covering layer so as to cover at least a part of the center core.

Example 8

First, to 50 ml of water were added $2.56 \times 10^{-4}$ mol of copper(II) sulfate, $6.04 \times 10^{-4}$ mol of silver(I) sulfate and $2.62 \times 10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to obtain a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added to disperse therein, and the mixture was heated under stirring with a rotation rate of 300 rpm at 120° C. for 30 minutes. After the heating, the dispersion was again allowed to stand for 60 minutes to precipitate the heated metal powder, then, the supernatant solution was discharged and 100 mL of water was added thereto and stirred at a rotation rate of 300 rpm for 10 minutes, which operations were repeated four times to carry out washing. Finally, this powder was dried by a vacuum dryer to obtain solder powder comprising Ag and an intermetallic compound $Ag_3Sn$ as a center core, tin as a covering layer, and an intermetallic compound $Cu_6Sn_5$ being interposed between the center core and the covering layer so as to cover at least a part of the center core.

Example 9

First, to 50 ml of water were added $9.86 \times 10^{-5}$ mol of copper(II) sulfate, $7.26 \times 10^{-5}$ mol of silver(I) sulfate and $2.62 \times 10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to obtain a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added thereto to disperse therein, and the mixture was heated under stirring with a rotation rate of 300 rpm at 120° C. for 30 minutes. After the heating, the dispersion was again allowed to stand for 60 minutes to precipitate the heated metal powder, then, the supernatant solution was discharged and 100 mL of water was added thereto and stirred at a rotation rate of 300 rpm for 10 minutes, which operations were repeated four times to carry out washing. Finally, this powder was dried by a vacuum dryer to obtain solder powder comprising an intermetallic compound $Ag_3Sn$ as a center core, tin as a covering layer, and an intermetallic compound $Cu_6Sn_5$ being interposed between the center core and the covering layer so as to cover at least a part of the center core.

Example 10

First, to 50 ml of water were added $8.25 \times 10^{-4}$ mol of copper(II) sulfate, $1.54 \times 10^{-3}$ mol of silver(I) sulfate and $2.62 \times 10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to prepare a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added thereto to disperse therein, and the mixture was heated under stirring with a rotation rate of 300 rpm at 120° C. for 30 minutes. After the heating, the dispersion was again allowed to stand for 60 minutes to precipitate the heated metal powder, then, the supernatant solution was discharged and 100 mL of water was added thereto and stirred at a rotation rate of 300 rpm for 10 minutes, which operations were repeated four times to carry out washing. Finally, this powder was dried by a vacuum dryer to obtain solder powder comprising an intermetallic compound $Ag_3Sn$ as a center core, tin as a covering layer, and an intermetallic compound $Cu_6Sn_5$ being interposed between the center core and the covering layer so as to cover at least a part of the center core.

Example 11

First, to 50 ml of water were added $2.45 \times 10^{-5}$ mol of copper(II) sulfate, $7.22 \times 10^{-6}$ mol of silver(I) sulfate and $2.62 \times 10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to obtain a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added thereto to disperse therein, and the mixture was heated under stirring with a rotation rate of 300 rpm at 120° C. for 30 minutes. After the heating, the dispersion was again allowed to stand for 60 minutes to precipitate the heated metal powder, then, the supernatant solution was discharged and 100 mL of water was added thereto and stirred at a rotation rate of 300 rpm for 10 minutes, which operations were repeated four times to carry out washing. Finally, this powder was dried by a vacuum dryer to obtain solder powder comprising an intermetallic compound $Ag_3Sn$ as a center core, tin as a covering layer, and an intermetallic compound $Cu_6Sn_5$ being interposed between the center core and the covering layer so as to cover at least a part of the center core.

Example 12

First, to 50 ml of water were added $1.24 \times 10^{-3}$ mol of copper(II) sulfate, $1.83 \times 10^{-3}$ mol of silver(I) sulfate and $2.62 \times 10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to obtain a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing.

Thereafter, 100 mL of ethylene glycol was added thereto to disperse therein, and the mixture was heated under stirring with a rotation rate of 300 rpm at 120° C. for 30 minutes. After the heating, the dispersion was again allowed to stand for 60 minutes to precipitate the heated metal powder, then, the supernatant solution was discharged and 100 mL of water was added thereto and stirred at a rotation rate of 300 rpm for 10 minutes, which operations were repeated four times to carry out washing. Finally, this powder was dried by a vacuum dryer to obtain solder powder comprising an intermetallic compound $Ag_3Sn$ as a center core, tin as a covering layer, and an intermetallic compound $Cu_6Sn_5$ being interposed between the center core and the covering layer so as to cover at least a part of the center core.

Comparative Example 2

To 50 mL of water were added $1.59 \times 10^{-4}$ mol of copper(II) sulfate, $4.10 \times 10^{-4}$ mol of silver(I) sulfate and $2.62 \times 10^{-2}$ mol of tin(II) sulfate, and the mixture was stirred by using a stirrer with a rotation rate of 300 rpm for 5 minutes to prepare a dissolved solution. After pH of the dissolved solution was adjusted to 0.5 with sulfuric acid, 0.5 g of polyvinyl alcohol 500 was added thereto as a dispersing agent, and the resulting mixture was further stirred at a rotation rate of 300 rpm for 10 minutes. Then, to the dissolved solution was added 50 mL of 1.58 mol/L divalent chromium ion aqueous solution whose pH having been adjusted to 0.5 with an addition rate of 50 mL/sec, and each metal ion was reduced by stirring at a rotation rate of 500 rpm for 10 minutes to obtain a dispersion in which metal powder is dispersed in the liquid. The dispersion was allowed to stand for 60 minutes to precipitate the formed metal powder, then, the supernatant solution was discharged, and 100 mL of water was added thereto and stirred at a rotation rate of 300 rpm for 10 minutes, which operations were repeated four times to carry out washing. This powder was dried by a vacuum dryer to obtain solder powder comprising Ag as a center core, Cu as an intermediate layer and tin as a covering layer.

Comparative Test and Evaluation

Figure 2:
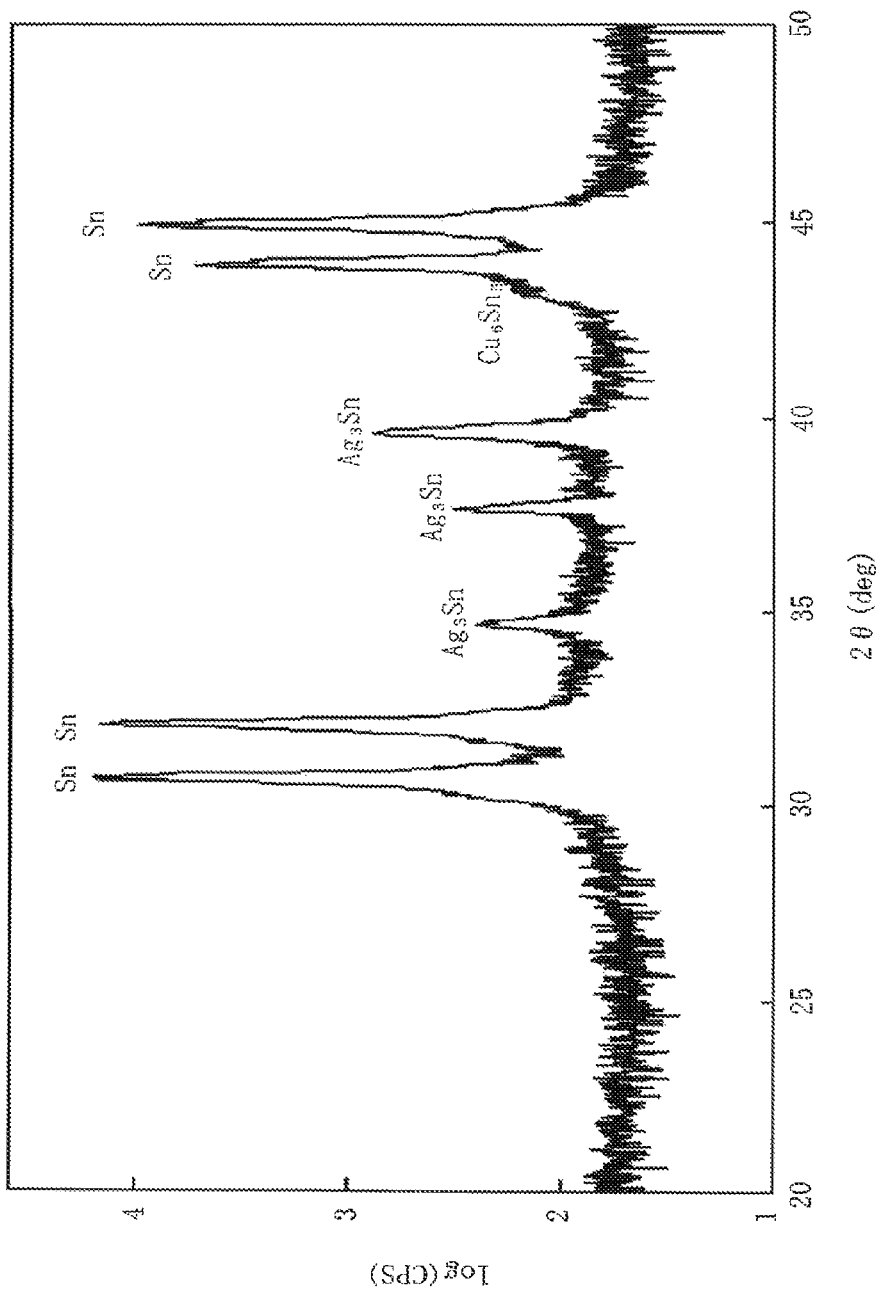
FIG. 2 is a measurement result by the XRD of the solder powder obtained in Example 1.
Figure 3:
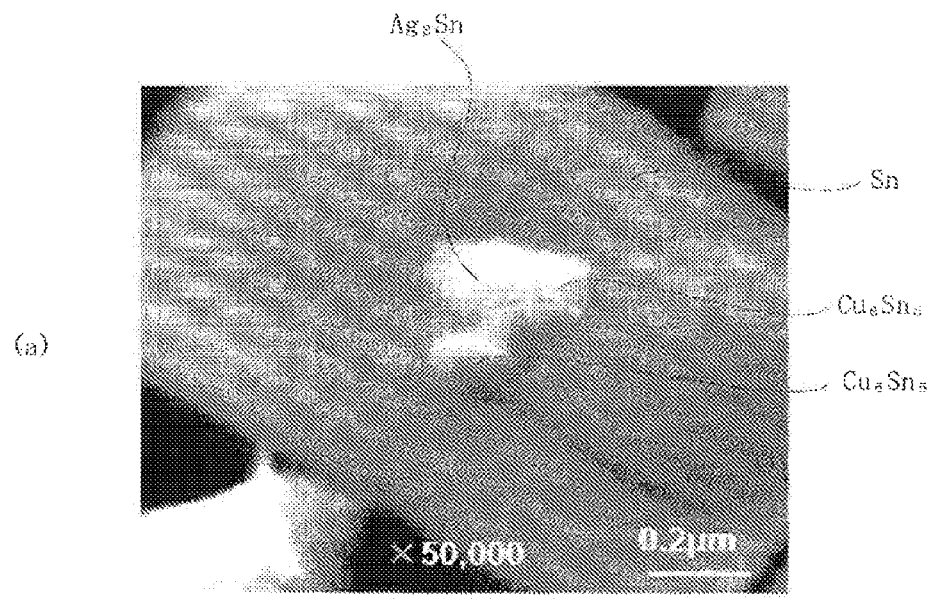
FIG. 3 is a photographic view when the cross section of the solder powder obtained in Example 1 was observed by an Auger electron spectroscopy.
Figure 3:
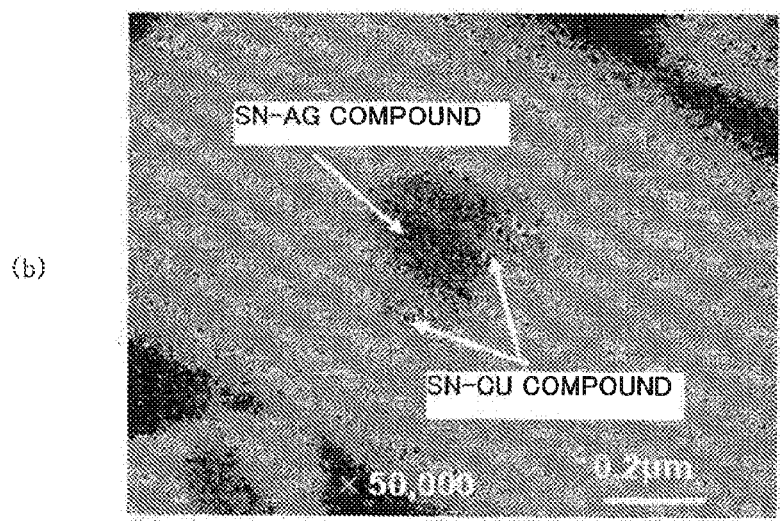
Figure 5:
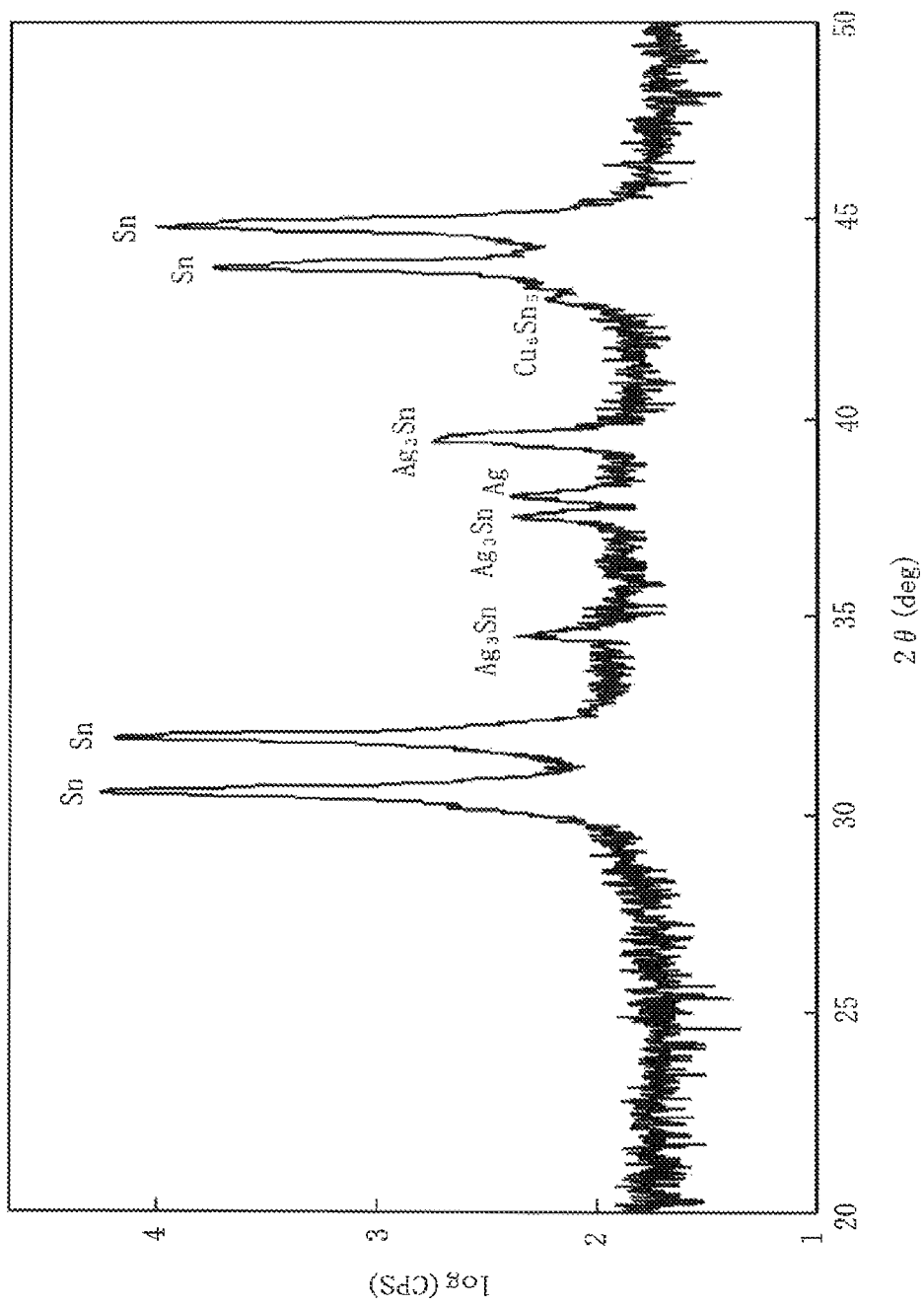
FIG. 5 is a measurement result by the XRD of the solder powder obtained in Example 7.
Figure 6:
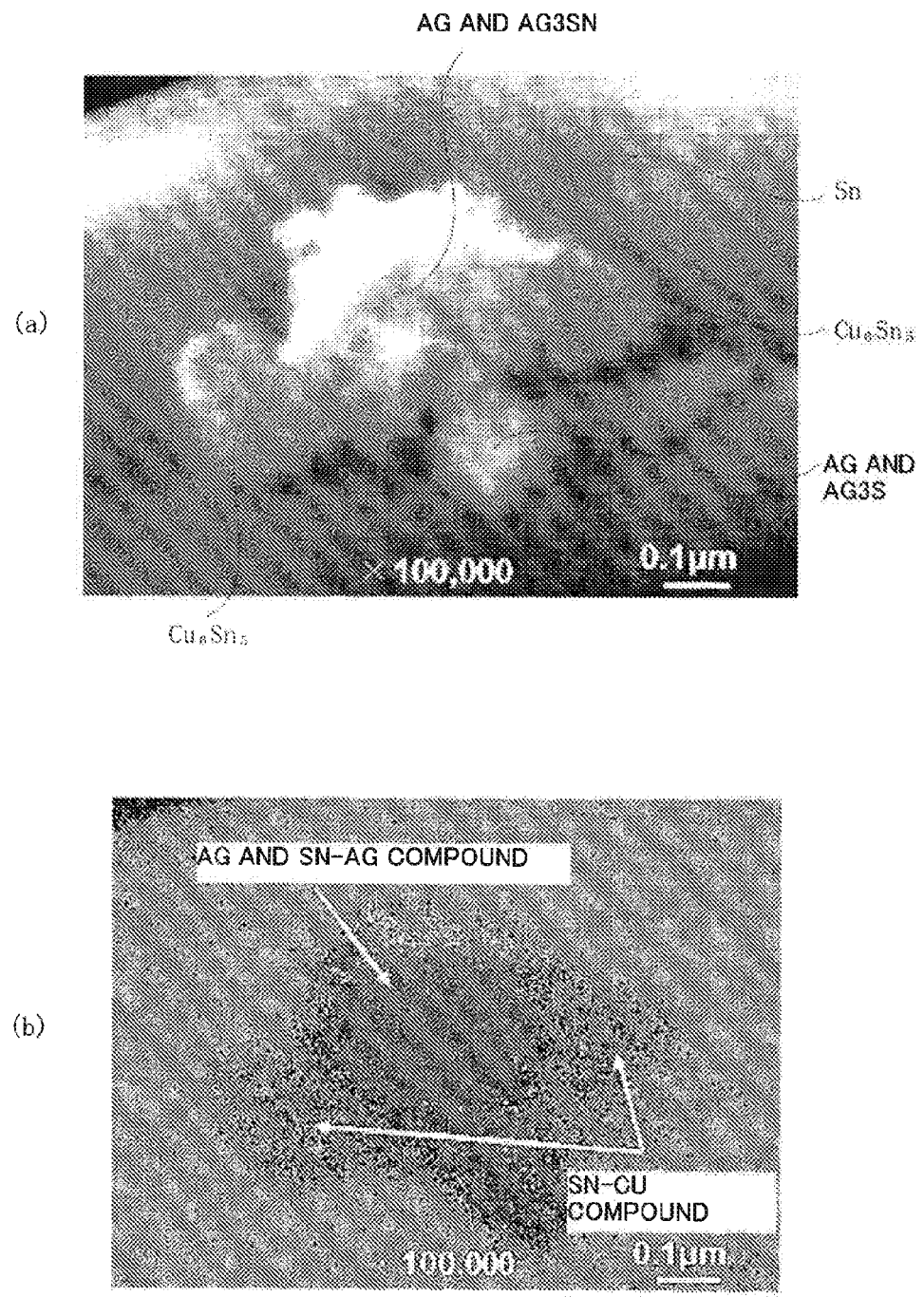
FIG. 6 is a photographic view when the cross section of the solder powder obtained in Example 7 was observed by an Auger electron spectroscopy.

With regard to the solder powders obtained in Examples 1 to 12 and Comparative Examples 1 and 2, analysis or measurement of a structure of metal particles constituting the powder, an average particle size of the powder, and a composition thereof were carried out according to the methods mentioned below, and wettability of the solder powder was evaluated. These results are shown in the following Table 1 and Table 2. Also, XRD structural analysis data of the solder powder obtained in Example 1 are shown in FIG. 2, and those of the solder powder obtained in Example 7 are shown in FIG. 5. Further, a photographic view when the cross section of the powder of the solder powder obtained in Example 1 was observed is shown in FIG. 3, and that of the solder powder obtained in Example 7 was observed is shown in FIG. 6. Incidentally, FIG. 3 (*a*) and FIG. 6 (*a*) are electron beam images, FIG. 3 (*b*) is a mapping image of the respective compositional elements of the same object as that of FIG. 3 (*a*), and FIG. 6 (*b*) is the same object as that of FIG. 6 (*a*).

(1) Structural analysis: Structural analysis was carried out by a powder X-ray diffraction apparatus (manufactured by Rigaku Corporation: RINT Ultima+/PC). Also, a sectional structure of the powder was observed by using a scanning type Auger electron spectroscopy analysis device (UL-VAC-PHI INCORPORATED, Name of type: PHI700).
(2) Average particle size: particle size distribution was measured by a particle size distribution measurement device (manufactured by HORIBA Ltd., laser diffraction/scattering type particle size distribution measurement device LA-950) using a laser diffraction scattering method, and the volume cumulative median diameter (Median diameter, $D_{50}$) was made to be an average particle size of the solder powder.
(3) Composition: Contents of metal elements were measured by using an inductively coupled plasma-atomic emission spectroscopy (manufactured by Shimadzu Corporation, ICP emission spectrometer: ICPS-7510).
(4) Wettability: It was carried out according to the "flux efficacy and dewetting test" described in JISZ3284. With regard to the evaluation, a degree of wetting and spreading was similarly divided into 1 to 4.

As shown in FIG. 2, in the XRD structural analysis, a peak designating Sn, a peak designating $Ag_3Sn$, and a peak designating $Cu_6Sn_5$ have been detected, and from the sectional structure of the powder shown in FIG. 3(a) to (b), it can be confirmed that the solder powder of Example 1 is constituted by three kinds of Sn, and $Ag_3Sn$ and $Cu_6Sn_5$ which are intermetallic compounds.

Also, as can be clearly seen from Table 1, when Examples 1 and 2 and Comparative Example 1 are compared with each other, in the solder powder of Comparative Example 1 in which each of the center core and the intermediate layer consists of a single metal element, the degree of wetting and spreading is "3", while in the metal powders of Examples 1 and 2 in which the center core consists of $Ag_3Sn$ and the intermediate layer consists of $Cu_6Sn_5$, $Ag_3Sn$ and $Cu_6Sn_5$ being intermetallic compounds, the degree of wetting and spreading is "1", whereby it can be confirmed that the wettability is improved by making the center core and the intermediate layer to be an intermetallic compound.

Also, when Example 3 and Example 5, and Example 4 and Example 6 are each compared with each other, in Example 5 in which both ratios of Ag and Cu are less than 0.1% by mass, the degree of wetting and spreading was evaluated to be "2" which is slightly worse than that of Example 3. The reason for this is considered that as the composition came close to the tin single material, oxidation of the solder powder proceeded. Also, in Example 6 in which the ratio of Ag exceeds 10% by mass and the ratio of Cu exceeds 2% by mass, the degree of wetting and spreading was evaluated to be "2" which is slightly worse than that of Example 4. The reason for this is considered that as the ratios of Ag and Cu increased, the solid-liquid co-presenting region was broadened, whereby the fluidity of the melt was lowered. To the contrary, in Examples 3 and 4 in which the ratio of Ag is within the range of 0.1 to 10% by mass and the ratio of Cu is within the range of 0.1 to 2.0% by mass, the degree of wetting and spreading was evaluated to be "1", and extremely excellent wettability was resulted.

TABLE 1

| | Heating temperature [° C.] | Time [min] | Center core | Intermediate layer | Covering layer | Content [% by mass] | | | Average particle size [μm] | Degree of wetting and spreading |
|---|---|---|---|---|---|---|---|---|---|---|
| | | | | | | Tin | Silver | Copper | | |
| Example 1 | 160 | 30 | $Ag_3Sn$ | $Cu_6Sn_5$ | Sn | 96.5 | 3 | 0.5 | 2.3 | 1 |
| Example 2 | 160 | 30 | $Ag_3Sn$ | $Cu_6Sn_5$ | Sn | 95.5 | 4 | 0.5 | 2.2 | 1 |
| Example 3 | 160 | 30 | $Ag_3Sn$ | $Cu_6Sn_5$ | Sn | 99.3 | 0.5 | 0.2 | 3.1 | 1 |
| Example 4 | 160 | 30 | $Ag_3Sn$ | $Cu_6Sn_5$ | Sn | 89.0 | 9.5 | 1.5 | 1.9 | 1 |
| Example 5 | 160 | 30 | $Ag_3Sn$ | $Cu_6Sn_5$ | Sn | 99.9 | 0.05 | 0.05 | 3.5 | 2 |
| Example 6 | 160 | 30 | $Ag_3Sn$ | $Cu_6Sn_5$ | Sn | 86.8 | 11.0 | 2.2 | 2.3 | 2 |
| Comparative Example 1 | — | — | Ag | Cu | Sn | 96.5 | 3 | 0.5 | 2.3 | 3 |

TABLE 2

| | Heating temperature [° C.] | Time [min] | Center core | Intermediate layer | Covering layer | Content [% by mass] | | | Average particle size [μm] | Degree of wetting and spreading |
|---|---|---|---|---|---|---|---|---|---|---|
| | | | | | | Tin | Silver | Copper | | |
| Example 7 | 120 | 30 | Ag | $Ag_3Sn$ | $Cu_6Sn_5$ | Sn | 96.5 | 3 | 0.5 | 2.3 | 1 |
| Example 8 | 120 | 30 | Ag | $Ag_3Sn$ | $Cu_6Sn_5$ | Sn | 95.5 | 4 | 0.5 | 2.2 | 1 |
| Example 9 | 120 | 30 | Ag | $Ag_3Sn$ | $Cu_6Sn_5$ | Sn | 99.3 | 0.5 | 0.2 | 3.1 | 1 |
| Example 10 | 120 | 30 | Ag | $Ag_3Sn$ | $Cu_6Sn_5$ | Sn | 89.0 | 9.5 | 1.5 | 1.9 | 1 |
| Example 11 | 120 | 30 | Ag | $Ag_3Sn$ | $Cu_6Sn_5$ | Sn | 99.9 | 0.05 | 0.05 | 3.5 | 2 |
| Example 12 | 120 | 30 | Ag | $Ag_3Sn$ | $Cu_6Sn_5$ | Sn | 86.8 | 11.0 | 2.2 | 2.3 | 2 |
| Comparative Example 2 | — | — | | Ag | Cu | Sn | 96.5 | 3 | 0.5 | 2.3 | 3 |

It can be understood that Sn, and $Ag_3Sn$ and $Cu_6Sn_5$ which are intermetallic compounds are contained in the solder powder of Example 7 from the sectional structure of the powder shown in FIGS. 6(a) and (b). On the other hand, it could not be clearly confirmed that Ag is contained in the center core from FIGS. 6(a) and (b), but in the results of the XRD structural analysis shown in FIG. 5, other than a peak designating Sn, a peak designating $Ag_3Sn$ and a peak designating $Cu_6Sn_5$, a peak designating Ag has been detected, so that it can be confirmed that the solder powder of Example 7 is constituted by four kinds of Ag, Sn, and $Ag_3Sn$ and $Cu_6Sn_5$ which are intermetallic compounds.

Also, as can be clearly seen from Table 2, when Examples 7 and 8 and Comparative Example 2 are compared with each other, in the solder powder of Comparative Example 2 in which the center core and the intermediate layer each comprise a single metal element, the degree of wetting and spreading is "3", while in the metal powders of Examples 7 and 8 in which the center core consists of Ag and $Ag_3Sn$ which is an intermetallic compound and the intermediate layer consists of $Cu_6Sn_5$ which is an intermetallic compound, the degree of wetting and spreading is "1", whereby it can be confirmed that the wettability is improved by making the center core and the intermediate layer an intermetallic compound.

Also, when Example 9 and Example 11, and Example 10 and Example 12 are each compared with each other, in Example 11 in which both ratios of Ag and Cu are less than 0.1% by mass, the degree of wetting and spreading was evaluated to be "2" which is slightly worse than that of Example 9. The reason for this is considered that as the composition came close to the tin single material, oxidation of the solder powder proceeded. Also, in Example 12 in which the ratio of Ag exceeds 10% by mass and the ratio of Cu exceeds 2% by mass, the degree of wetting and spreading was evaluated to be "2" which is slightly worse than that of Example 10. The reason for this is considered that as the ratios of Ag and Cu increased, the solid-liquid co-presenting region was broadened, whereby the fluidity of the melt was lowered. To the contrary, in Examples 9 and 10 in which the ratio of Ag is within the range of 0.1 to 10% by mass and the ratio of Cu is within the range of 0.1 to 2.0% by mass, the degree of wetting and spreading was evaluated to be "1", and extremely excellent wettability was resulted.

INDUSTRIAL APPLICABILITY

The solder powder of the present invention can be utilized as a lead-free solder powder for fine pitch, and a paste for solder obtained by using the solder powder as a starting material can be suitably used for mounting fine electronic parts.

This International Patent Application claims priorities of Japanese Patent Application No. 2011-191867 filed on Sep. 2, 2011 and Japanese Patent Application No. 2011-191868 filed on Sep. 2, 2011, and the whole contents of Japanese Patent Application No. 2011-191867 and Japanese Patent Application No. 2011-191868 are incorporated in this International Patent Application by reference.

EXPLANATION OF THE REFERENCE NUMERALS

10 Solder powder
11 Center core
11a Silver
11b Intermetallic compound of silver and tin
12 Intermediate layer (intermetallic compound of copper and tin)
13 Covering layer (tin)

The invention claimed is:

1. A solder powder having an average particle size of 5 μm or less and having a center core and a covering layer covering the center core, wherein
   the center core consists of an intermetallic compound of silver and tin, or silver and an intermetallic compound of silver and tin,
   the covering layer consist of tin, and
   an intermediate layer which consists of an intermetallic compound of copper and tin is interposed between the center core and the covering layer so that at least a part of the center core is covered thereby.

2. The solder powder according to claim 1, wherein the intermetallic compound of silver and tin is $Ag_3Sn$ or $Ag_4Sn$, and the intermetallic compound of copper and tin is $Cu_3Sn$ or $Cu_6Sn_5$.

3. The solder powder according to claim 1, wherein a content of silver is 0.1 to 10% by mass and a content of copper is 0.1 to 2.0% by mass based on a total amount of the solder powder as 100% by mass.

4. A paste for solder obtained by mixing the solder powder according to claim 1 and a flux for a solder to make a paste.

5. The paste for solder according to claim 4, which is used for mounting electronic parts.

* * * * *